(12) United States Patent
Bender

(10) Patent No.: US 8,870,995 B1
(45) Date of Patent: Oct. 28, 2014

(54) AIR FILTER SYSTEM FOR USE WITH AN HVAC REGISTER

(71) Applicant: Kelly Bender, Dallas, TX (US)

(72) Inventor: Kelly Bender, Dallas, TX (US)

( * ) Notice: Subject to any disclaimer, the term of this patent is extended or adjusted under 35 U.S.C. 154(b) by 16 days.

(21) Appl. No.: 14/022,548

(22) Filed: Sep. 10, 2013

(51) Int. Cl.
*B01D 46/00* (2006.01)

(52) U.S. Cl.
CPC .................................. *B01D 46/0005* (2013.01)
USPC ................... 55/508; 55/493; 55/501; 55/506; 55/521

(58) Field of Classification Search
CPC ... B01D 46/02; B01D 46/2411; B01D 46/521
USPC ............. 55/355.1, 385.2, 481, 484, 506, 508, 55/493, 501, 521, DIG. 29, DIG. 31, 55/DIG. 35
See application file for complete search history.

(56) References Cited

U.S. PATENT DOCUMENTS

| | | | |
|---|---|---|---|
| D382,049 S | 8/1997 | Trampp | |
| 6,361,578 B1 | 3/2002 | Rubinson | |
| 7,789,928 B2 | 9/2010 | Stepp | |
| 7,811,346 B1 * | 10/2010 | Henson | 55/385.1 |
| 7,879,125 B2 * | 2/2011 | Haberkamp et al. | 55/521 |
| 2003/0145568 A1 | 8/2003 | Hodge | |
| 2006/0096261 A1 | 5/2006 | Zhang | |
| 2010/0227545 A1 | 9/2010 | Frios | |
| 2012/0060695 A1 | 3/2012 | Hepburn | |
| 2012/0079945 A1 | 4/2012 | Roberts | |

* cited by examiner

*Primary Examiner* — Robert Clemente
*Assistant Examiner* — Karla Hawkins

(57) ABSTRACT

The air filter system includes a cover that is configured to secure itself adjacent to an HVAC register. The cover includes hanger members on distal ends, which hook onto screw holes of the HVAC register. The cover includes a plurality of openings forming a vent through which air is able to pass. The cover is configured to be loosely hung underneath the HVAC register such that air-conditioned air is able to blow through the cover as well as along a peripheral opening formed between the cover and the HVAC register. The cover includes a filter member that is selectively removed, and positioned in between the cover and the HVAC register. The filter has a rectangular shape that corresponds to the cover. The filter also has lipped peripheral portion that has a thickness greater than a center portion.

5 Claims, 4 Drawing Sheets

AIR FILTER SYSTEM FOR USE WITH AN HVAC REGISTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of plumbing tools, more specifically, an air filter system configured for use with an HVAC register in order to further filter air-conditioned air.

SUMMARY OF THE INVENTION

An embodiment of the disclosure meets the needs presented above by generally comprising a cover that is configured to secure itself adjacent to an HVAC register. The cover includes hanger members on distal ends, which hook onto screw holes of the HVAC register. The cover includes a plurality of openings forming a vent through which air is able to pass. The cover is configured to be loosely hung underneath the HVAC register such that air-conditioned air is able to blow through the cover as well as along a peripheral opening formed between the cover and selectively removed, and positioned in between the cover and the HVAC register. The filter has a rectangular shape that corresponds to the cover. The filter also has lipped peripheral portion that has a thickness greater than a center portion. The lipped peripheral portion is configured to fill in the peripheral opening formed between the cover and the HVAC register.

An object of the invention is to provide a device that is configured to work with an HVAC register in order to filter air-conditioned air exiting the HVAC register.

A further object of the invention is for the cover to be configured to secure itself to the screw holes of the HVAC register.

Another object of the invention is for the cover and air filter system to be adapted for use with a ceiling, a wall, or a floor application in order to not limit available uses of the invention with different locations of HVAC registers.

These together with additional objects, features and advantages of the air filter system will be readily apparent to those of ordinary skill in the art upon reading the following detailed description of presently preferred, but nonetheless illustrative, embodiments of the air filter system when taken in conjunction with the accompanying drawings.

In this respect, before explaining the current embodiments of the air filter system in detail, it is to be understood that the air filter system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the air filter system.

It is therefore important that the claims be regarded as including such equivalent construction insofar as they do not depart from the spirit and scope of the air filter system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
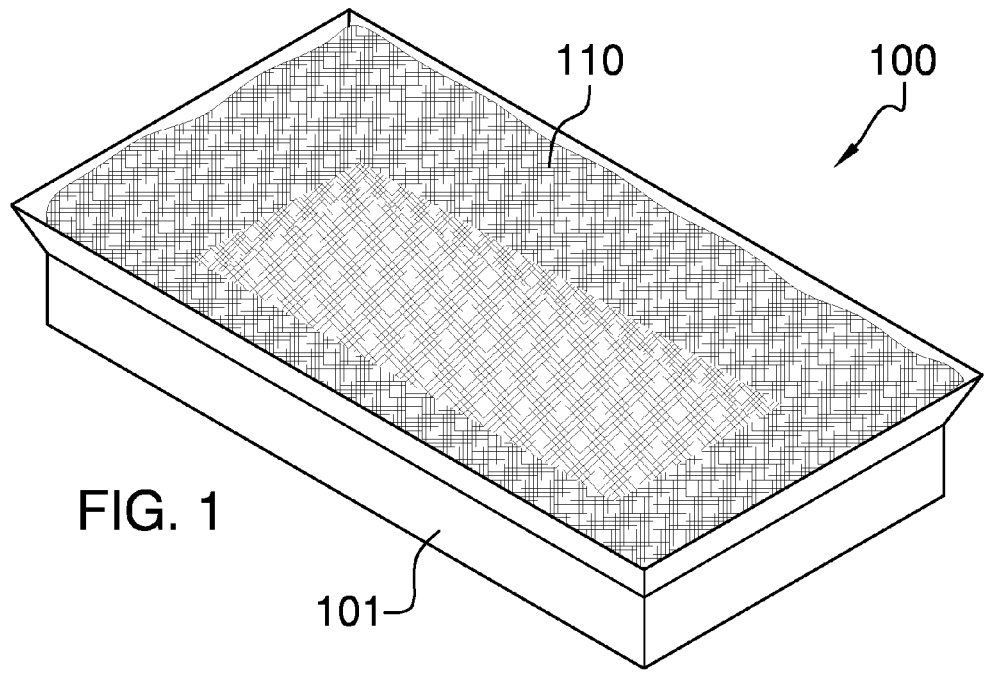
FIG. 1 is a perspective view of the air filter system by itself.
Figure 2:
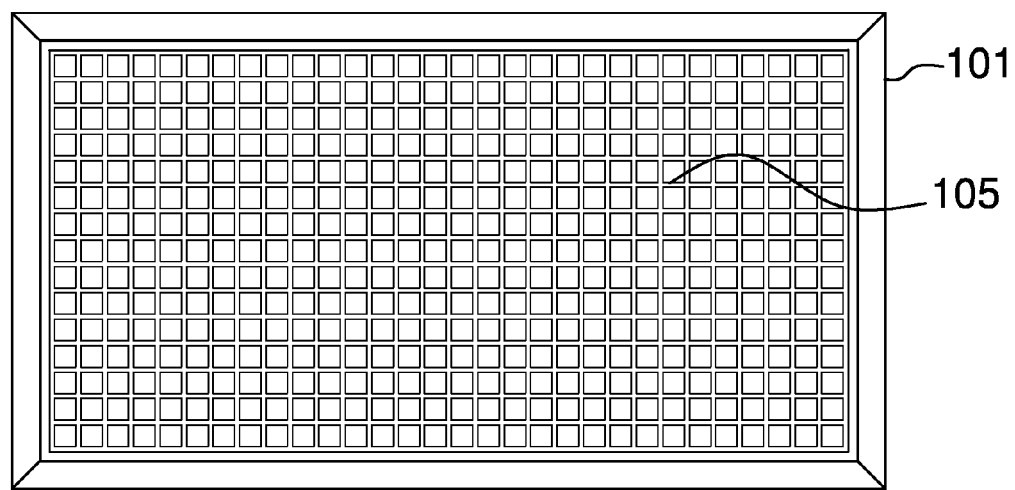
FIG. 2 is a bottom view of the cover.
Figure 3:
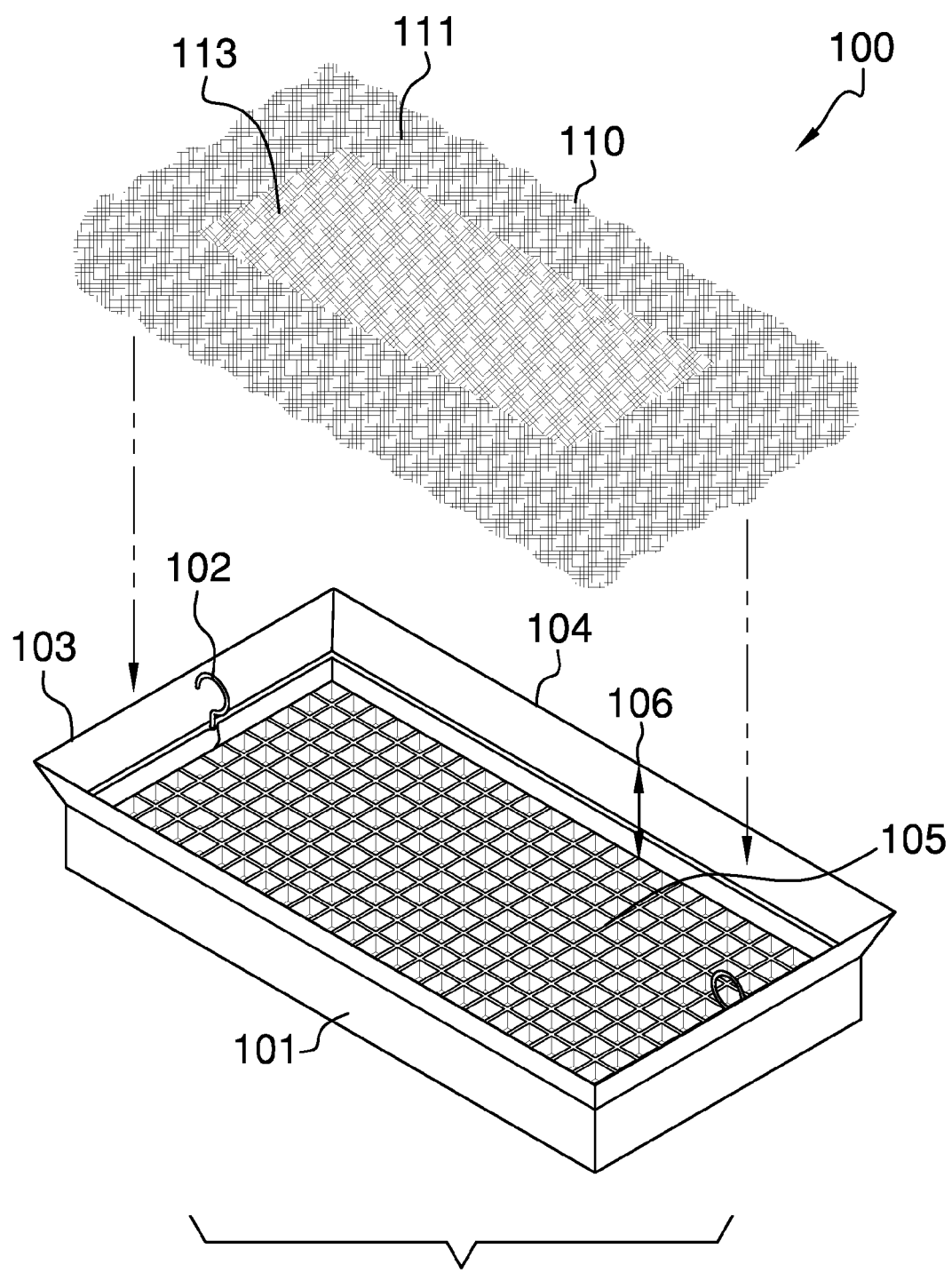
FIG. 3 is an exploded, perspective view of the air filter system.
Figure 4:
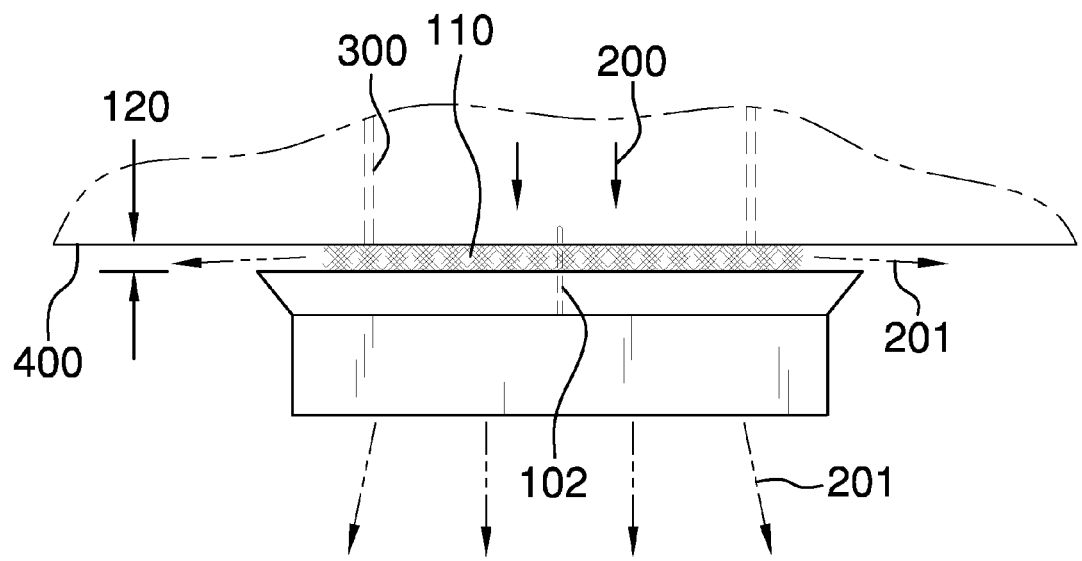
FIG. 4 is a side view of the air filter system in use.
Figure 5:
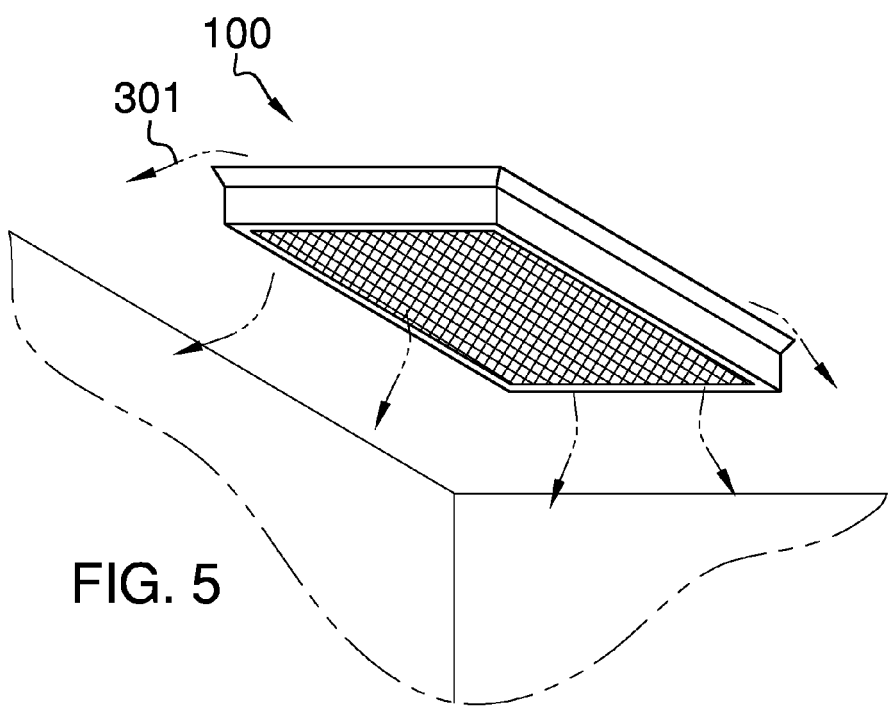
FIG. 5 is a perspective view of the air filter system in use.
Figure 6:
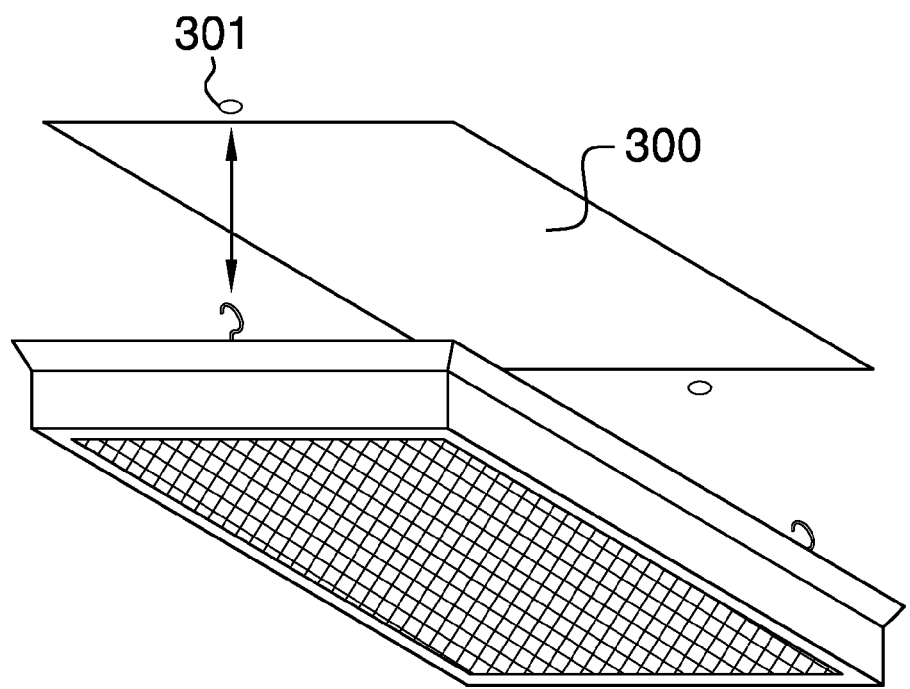
FIG. 6 illustrates securement of the hanger members of the cover to the screw holes of the HVAC register.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 7, the air filter system 100 (hereinafter invention) is further comprised of a cover 101 that includes hanger members 102 adjacent distal ends 103 of the cover 101. The cover 101 is further defined with a top, peripheral edge 104, a plurality of openings 105 that define a central portion of the cover 101. The top, peripheral edge 104 is elevated above the openings 105 by a height 106, which accommodates a filter 110 to be nested therein.

The openings 105 form a lattice, which enables air-conditioned air 200 to pass across the cover 101. The hanger members 102 are contained within the top, peripheral edge 104. The hanger members 102 are configured to secure the cover 101 adjacent to an HVAC register 300. Moreover, the hanger members 102 hook onto screw holes 301 of the HVAC register 300. The hanger members 102 enable a peripheral opening 120 to exist between the top, peripheral edge 104 of the cover 101 and the wall surface 400. The peripheral opening 120 is important to further reduce the air resistance of the invention 100 with respect to the air-conditioned air 200 exiting the HVAC register 300.

The air-conditioned air 200 exiting the HVAC register 300 shall pass across the filter 110, and be filtered air-conditioned air 201 that exits either the peripheral opening 120 or the openings 105 of the cover 101.

Figure 7:
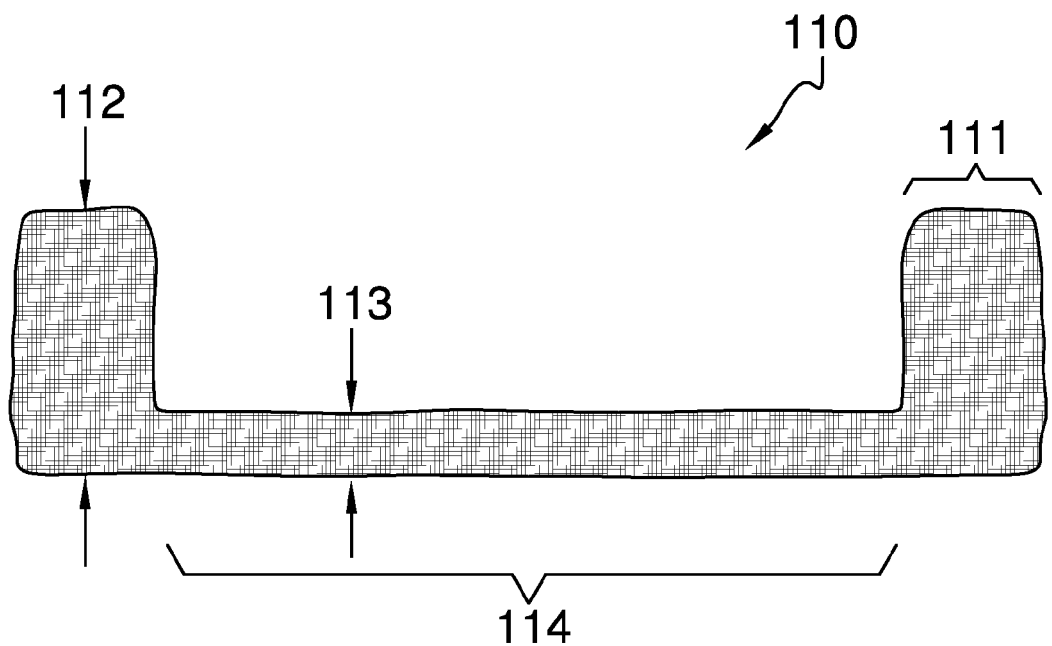
FIG. 7 is a cross-sectional view of the filter.

Referring to FIG. 7, the filter 110 has a unique design, and is further defined with a rectangular shape that corresponds to the cover 101. Moreover, the filter 110 also has lipped peripheral portion 111 that has a thickness 112 greater than a center portion thickness 113 of a center portion 114. The lipped peripheral portion 111 is configured to fill in the peripheral opening 120 formed between the cover 101 and the HVAC register 300. The center portion 114 is able to be positioned adjacent the openings 105 of the cover 101.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An air filter system comprising:
   a cover and an air filter that is nested within a top, peripheral edge of the cover;
   said cover includes two hanger members that are configured to secure the cover adjacent an HVAC register in order for air-conditioned air to be further filtered via the filter;
   wherein the hanger members are provided adjacent to distal ends of the cover; wherein the cover includes a plurality of openings that define a central portion of the cover; wherein the top, peripheral edge is elevated above the openings by a height, which accommodates the filter therein;
   wherein the openings form a lattice, which enables the air-conditioned air to pass thru the cover; wherein the hanger members are contained within the top, peripheral edge; wherein the hanger members hook onto screw holes of the HVAC register;
   wherein the hanger members enable a peripheral opening to exist between the top, peripheral edge of the cover and the wall surface; and wherein the filter has a lipped peripheral portion that has a thickness greater than a center portion thickness of a center portion.

2. The air filter system according to claim 1 wherein the air-conditioned air exiting the HVAC register passes across the filter, and becomes filtered air-conditioned air that exits either the peripheral opening or the openings of the cover.

3. The air filter system according to claim 1 wherein the lipped peripheral portion is configured to fill in the peripheral opening formed between the cover and the HVAC register; wherein the center portion is positioned adjacent the openings of the cover.

4. An air filter system comprising:
   a cover and an air filter that is nested within a top, peripheral edge of the cover;
   said cover includes two hanger members that are configured to secure the cover adjacent an HVAC register in order for air-conditioned air to be further filtered via the filter;
   wherein the hanger members are provided adjacent to distal ends of the cover; wherein the cover includes a plurality of openings that define a central portion of the cover; wherein the top, peripheral edge is elevated above the openings by a height, which accommodates the filter therein;
   wherein the openings form a lattice, which enables the air-conditioned air to pass thru the cover; wherein the hanger members are contained within the top, peripheral edge; wherein the hanger members hook onto screw holes of the HVAC register;
   wherein the hanger members enable a peripheral opening to exist between the top, peripheral edge of the cover and the wall surface;
   wherein the air-conditioned air exiting the HVAC register passes across the filter, and becomes filtered air-conditioned air that exits either the peripheral opening or the openings of the cover;
   wherein the filter has a lipped peripheral portion that has a thickness greater than a center portion thickness of a center portion; and wherein the lipped peripheral portion is configured to fill in the peripheral opening formed between the cover and the HVAC register; wherein the center portion is positioned adjacent the openings of the cover.

5. The air filter system according to claim 4 wherein the lipped peripheral portion is configured to fill in the peripheral opening formed between the cover and the HVAC register; wherein the center portion is positioned adjacent the openings of the cover.

* * * * *